United States Patent
Prigent

(10) Patent No.: US 8,221,068 B2
(45) Date of Patent: Jul. 17, 2012

(54) HYDRAULIC MACHINE MEMBER WITH AN ABRASION-RESISTANT REINFORCED EDGE AND A HYDRAULIC MACHINE USING THIS MEMBER

(75) Inventor: Serge Prigent, Le Sappey en Chartreuse (FR)

(73) Assignee: ALSTOM Hydro France, Levallois Perret (FR)

( * ) Notice: Subject to any disclaimer, the term of this patent is extended or adjusted under 35 U.S.C. 154(b) by 657 days.

(21) Appl. No.: 12/385,591

(22) Filed: Apr. 13, 2009

(65) Prior Publication Data
US 2009/0257864 A1 Oct. 15, 2009

(30) Foreign Application Priority Data
Apr. 14, 2008 (FR) ...................................... 08 52485

(51) Int. Cl.
*F04D 9/02* (2006.01)
(52) U.S. Cl. ....................................................... 415/200
(58) Field of Classification Search ................... 415/200
See application file for complete search history.

(56) References Cited

U.S. PATENT DOCUMENTS

| 3,778,181 A | 12/1973 | McFarlin |
| 2005/0103691 A1 | 5/2005 | Hakola |
| 2006/0127223 A1* | 6/2006 | Nakahama et al. ........ 416/241 R |
| 2007/0256862 A1* | 11/2007 | Lund et al. ...................... 175/39 |

FOREIGN PATENT DOCUMENTS

| GB | 859 293 A | 1/1961 |
| JP | 58 095108 | 6/1983 |
| WO | WO 03/093525 A | 11/2003 |
| WO | WO 2005/038062 A1 | 4/2005 |

\* cited by examiner

Primary Examiner — Gary F. Paumen
(74) Attorney, Agent, or Firm — Dowell & Dowell, PC

(57) ABSTRACT

This hydraulic machine member has at least one flow of water passing through it, and comprises at least one wetted surface extending between two edges of the member, at least one of the edges of the member and part of the adjacent wetted surface being reinforced and formed by at least one removable solid element made from material having a high resistance to abrasion.

15 Claims, 4 Drawing Sheets

HYDRAULIC MACHINE MEMBER WITH AN ABRASION-RESISTANT REINFORCED EDGE AND A HYDRAULIC MACHINE USING THIS MEMBER

BACKGROUND OF THE INVENTION

1. Field of the Invention

The present invention relates to hydraulic machines and more specifically to the members of such machines placed in direct contact with the flow of water whose energy is to be converted.

2. Description of the Related Art

For the purposes of the present invention, a hydraulic machine can be a turbine, a pump, or a pump/turbine, used, for example, in an electricity generating plant. In the case of a turbine, the machine is placed downstream of a pipe supplied directly by a watercourse or from a reservoir into which one or more watercourses discharge. Depending on the nature of the ground through which the watercourse flows and the meteorological conditions, the water supplied to the machine may contain abrasive particles such as sand or sediment. When these abrasive particles pass through the turbine, they wear the surfaces which are wetted by the flow of water, making it necessary to repair or replace these surfaces at regular intervals. These repairs make the operating costs of the hydraulic machine relatively high, due to the cost of the spare parts and the downtime of the machine.

There is consequently a requirement to increase the durability of the members of hydraulic machines subjected to the action of abrasive particles and to facilitate the repair of worn areas of these members.

SUMMARY OF THE INVENTION

In order to achieve these objects, the invention relates to a member of a hydraulic machine through which at least one flow of water passes, the hydraulic member comprising at least one wetted surface extending between two edges of the member, characterized in that at least one of the edges of the member and part of the adjacent wetted surface are reinforced and formed by at least one removable solid element made from material having a high resistance to abrasion.

By fitting such a removable solid element to at least one of the edges of the wetted surface of the hydraulic machine member, the resistance of the member can be increased in an area in which the wear is particularly marked because of the turbulent nature of the water flow. The presence of a solid element, that is to say, for the purposes of the invention, a monolithic element having dimensions measured in centimetres and preferably greater than half a centimetre, makes it possible to provide an area which, on the one hand, is more wear-resistant as a result of the material from which the removable solid element is made, and, on the other hand, has greater durability. This is because the removable element can provide wear areas which are deeper than those available with conventionally applied coatings with thicknesses of less than 500 micrometres. Moreover, the coatings used at present depend on the quality of the support. As hydraulic components are generally produced by casting, they may have open defects which reduce the life of present-day coatings. Conversely, the durability of the solid element according to the invention is independent of the quality of the support. Furthermore, the removable nature of the solid element enables it to be replaced rapidly, making the downtime of the hydraulic machine markedly less than that caused by the repair of a hydraulic machine when the wear surfaces protected by existing sprayed coatings have to be replaced or renewed.

According to one feature of the invention, the hydraulic member comprises fixing means for the removable solid element which are adapted to ensure that at least a part of the removable solid element is placed under compression. Placing it under compression in this way has the advantage of increasing the mechanical strength of the removable solid element, especially if it is made from technical ceramics.

According to another feature of the invention, the hydraulic member comprises a plurality of removable solid elements juxtaposed to form the reinforced edge of the hydraulic member. By using a plurality of juxtaposed removable solid elements, complex involute or left-hand shapes can be produced. Furthermore, the elements can be replaced independently of each other, according to their condition.

According to the invention, structures in the form of one or more removable solid elements can be applied to different functional parts of the hydraulic member. Thus, according to one feature of the invention, the reinforced edge is a leading edge of the hydraulic member.

According to another feature of the invention, the reinforced edge is a trailing edge of the hydraulic member.

Clearly, a hydraulic member according to the invention can comprise both a leading and a trailing edge, and any other edge, constructed using removable solid elements.

In order to offer high abrasion resistance and increase the durability of the removable solid element or elements used, according to one feature of the invention, each removable solid element is made from material having a Vickers hardness of 1000 HV or more.

According to yet another feature of the invention, the material from which each solid element is made is chosen from technical ceramics comprising a metallic matrix in which particles or a powder of an abrasion-resistant material are dispersed. For example, the metallic matrix can be chosen from CoCr, NiCr, NiFe and BSi alloys, while the material from which the powder is made can be chosen from diamond, boron nitride, tungsten carbide (WC), alloys of the SiC or $Al_2O_3$ type, or mixtures thereof.

Each solid element is produced, for example, by known powder metallurgy processes such as pressing and sintering.

According to the invention, the hydraulic members can form different parts of various types of hydraulic machines. However, it should be noted that the invention relates more particularly to large high-power hydraulic machines for which the nominal flow rates are generally above 1 $m^3/s$.

Thus, according to one embodiment of the invention, the hydraulic machine member is designed to form a flow control tip of a Pelton turbine nozzle and comprises a body on which the removable solid elements are stacked, a first of these elements having a generally annular shape with an outer surface having a generally conically tapered shape, while the final element has the shape of a conically tapered tip with a nominal diameter smaller than the nominal diameter of the first removable solid element. In a variant embodiment, the fixing means are adapted to compress all the removable elements except the final one. Thus the fixing means can be adapted to apply tension to the final removable solid element in such a way that at least part of the first solid element is placed under compression. Placing at least one of the solid elements under compression creates pre-stressing which contributes to an improvement of its mechanical characteristics with respect to the mechanical characteristics of the same element when idle in a non-pre-stressed state. Thus placing a solid element under compression according to the invention considerably increases its resistance to occasional impact by particles with dimensions of more than 300 μm as well as its resistance to hammering, that is to say frequent impact by particles with dimensions of less than 200 μm.

In another embodiment of the invention, the hydraulic member is designed to form a Pelton turbine nozzle orifice, and it comprises, on the one hand, a body comprising a through bore and, on the other hand, the removable solid element which is fitted in the through bore and has a generally annular shape so as to form a hydraulic ejection orifice and a bearing seat for a flow control tip of the nozzle, the solid element being surrounded by a band for placing the solid element under compression.

In yet another embodiment, the hydraulic member is designed to form a bucket of a Pelton turbine wheel and it comprises at least one central removable solid element forming the leading edge of a central ridge of the bucket and at least two lateral removable solid elements, each forming part of a lateral trailing edge of the bucket.

In another embodiment, the hydraulic member is designed to form a Francis turbine wheel or reversible turbine wheel and the removable solid elements form at least one labyrinth edge.

The invention also relates to a hydraulic machine comprising at least one hydraulic member according to the invention.

Clearly, the different features and variants of the hydraulic member and of the machine according to the invention can be combined with each other in different ways provided that they are not incompatible or mutually exclusive.

BRIEF DESCRIPTION OF THE DRAWINGS

Various other features of the invention will also be made clear by the description given below with reference to the appended drawings, which show various non-limiting embodiments of a hydraulic machine member according to the invention.

DESCRIPTION OF THE PREFERRED EMBODIMENTS

The invention thus proposes a hydraulic machine member in which certain parts of the wetted surface, and more specifically at least one edge, are composed of removable solid elements having high abrasion resistance. For guidance, this member will initially be described in the context of a use as an injection nozzle for a Pelton turbine as shown in FIG. 1 and indicated as a whole by the reference 1, although it is to be understood that a member according to the invention can be used in various other types of hydraulic machine.

Figure 1:
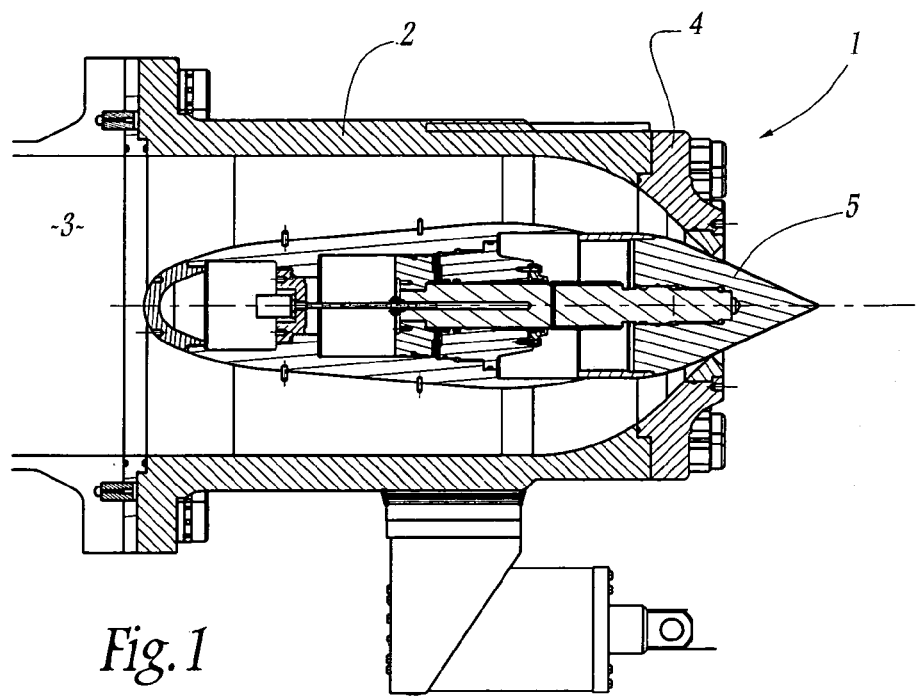
FIG. 1 is an axial section through an injection nozzle for a Pelton turbine using hydraulic members according to the invention.
Figure 2:
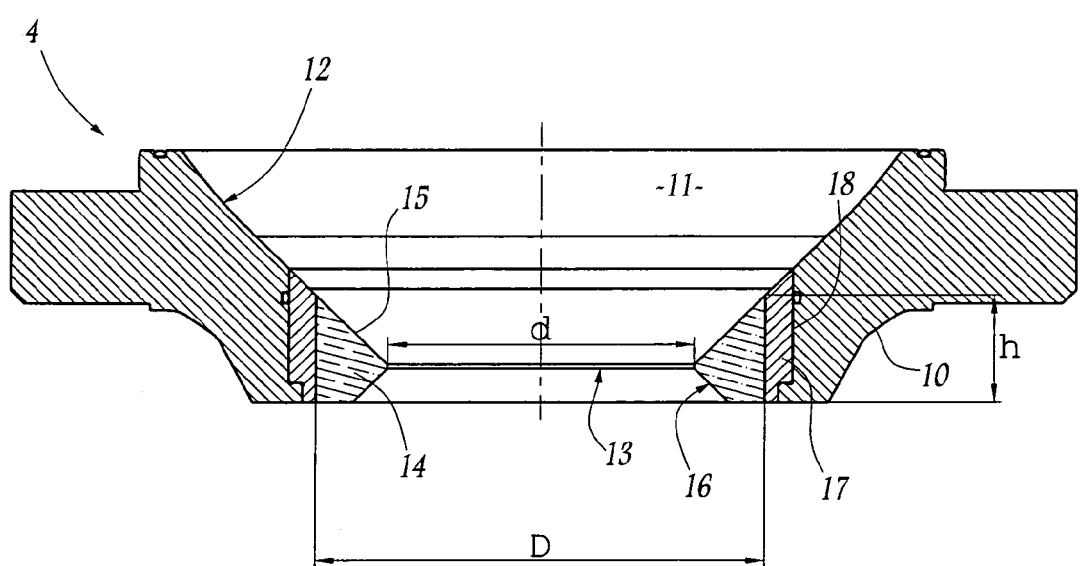
FIG. 2 is an axial section through a member according to the invention forming the nozzle orifice shown in FIG. 1.
Figure 3:
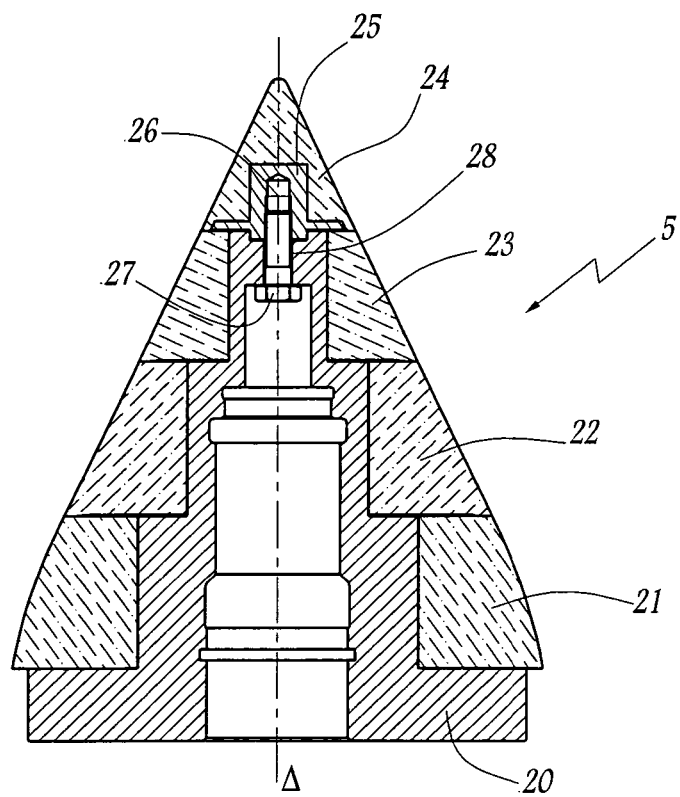
FIG. 3 is an axial section through another embodiment of a hydraulic member according to the invention designed to form the flow control tip of the Pelton turbine nozzle as shown in FIG. 1.

In FIG. 1, only the injection nozzle 1 of the Pelton turbine is shown, since the general embodiment of a Pelton turbine, that is to say its wheel and the various accessories required for its use, are well known to those skilled in the art and therefore do not require further explanation. As a general rule a Pelton turbine injection nozzle 1 has a body 2 of generally cylindrical shape which delimits a channel 3 for supplying a flow of water from a penstock which is not shown. The end of the channel 3 is thus defined by a nozzle orifice 4 which in this case is formed by a hydraulic member according to the invention.

In order to control the flow of water through the orifice 4, the nozzle 1 also comprises a control tip 5 which can be translated between a closed position of the nozzle as shown in FIG. 1, in which the tip bears on the orifice 4, and a retracted open position (not shown) in which the tip 5 is at a distance from the orifice 4 so as to allow the passage of the water that drives the turbine. Thus flow of water can be modulated according to the relative position of the tip 5 with respect to the orifice 4. In the illustrated example, the control tip 5 is also formed by a hydraulic member according to the invention.

The nozzle orifice 1 forming a hydraulic machine member according to the invention comprises a body 10 which has a through bore 11 whose inner surface 12 is wetted by the water supplied to the turbine. The inner bore 11 has a shape which converges from the inside of the channel 3 towards the outside, and more particularly towards an ejection orifice 13. In the illustrated example, the edge of the wetted surface 12 which delimits the orifice 13 is formed by a removable solid element 14 made from a material having high abrasion resistance. The element 14 has a generally annular shape including the ejection orifice 13 which is delimited by a converging inner part 15 and a diverging outer part 16. The solid element 14 is made, for example, by powder metallurgy, in such a way that it forms a monolithic technical ceramics element comprising a metallic matrix in which a reinforcing powder, composed of one or more hard abrasion-resistance materials, is dispersed.

To increase the mechanical strength of the element 14, the latter comprises a surrounding band 17 serving as its fixing means. The band 17 is made in such a way that it can be mounted in a bore 18 of complementary shape formed in the body 10. The band 17 is positioned in the bore 18 so as to enable the assembly which it forms with the solid element 14 to be extracted to enable the latter to be replaced. The band 17 is fitted to the solid element 14 by a shrink fitting method in such a way that, when it cools, the band 17 places the solid element 14 under compression and thus helps to augment its metallic properties, particularly its impact resistance. In the case which is illustrated, the solid element has a height h of about 10 cm, an outside diameter D of about 30 cm, and an inside diameter d of about 20 cm.

The control tip 5 is also formed by a member of which one edge and at least part of the wetted surface are reinforced according to the invention. Thus the tip 5 comprises a body 20 with rotational symmetry about the axis Δ, whose outer surface forms a succession of annular cylindrical bearing surfaces of decreasing diameter. The tip 5 also comprises four removable solid elements 21 to 24. The first removable element 21 is of generally annular shape with a cylindrical central bore whose shape is complementary to that of the body 20, in such a way that it can be fitted on to the latter without the possibility of radial displacement. The intermediate removable solid elements 22 and 23 have shapes very similar or identical to that of the first removable solid element 21, but with decreasing nominal diameters. The final removable solid element 24 has the general shape of a conically tapering tip. The outer surface of each of the removable elements 21 to 24 is made in such a way that, when stacked, they form a substantially continuous surface of generally conically tapering shape. Additionally, the final removable element 24, when fixed to the body 20, prevents any axial displacement of the stack of removable solid elements 20 to 24. For fixing, the final removable element 24 has a core 25 in the centre of which is formed a tapped hole 26 for receiving a fixing screw 27 which is engaged in a terminal bore 28 of the body 20. The core 25 and the screw 27 are made in such a way that the tension imparted by the screw 27 causes the first removable element 21 and the two intermediate removable elements 22 and 23 to be placed under compression. For this purpose, the dimensions of the body 20 and the basic shape of the intermediate elements 22 and 23 are defined in such a way that the pressure exerted by the core 26 is transmitted exclusively to the removable elements 21, 22 and 23. The body 20 then serves as an axial guide for the intermediate elements 22 and 23.

It should be noted that the first removable element 21 forms a proximal edge of the tip 5, while the final removable element forms a distal edge of this tip.

Figure 4:
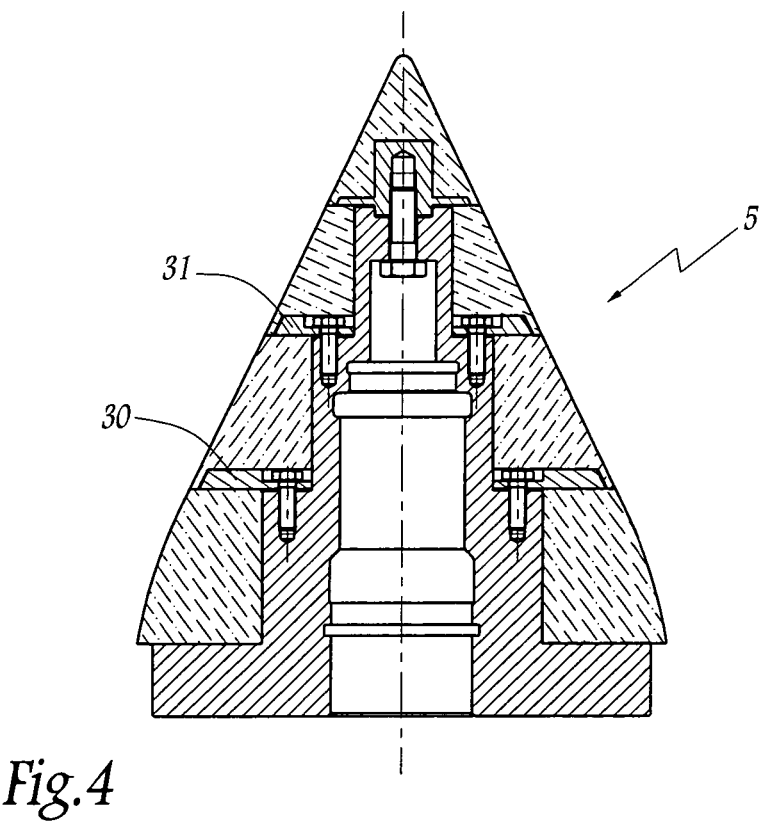
FIG. 4 shows a variant embodiment of the control tip as shown in FIG. 3.

Clearly, the removable elements 21 to 23 could be placed under compression by a different method. For example, FIG. 4 shows a variant embodiment of the tip 5 in which compression rings 30 and 31 are provided for the first removable element 21 and the intermediate removable element 22 to place the corresponding removable elements under compression. This placing under compression, or pre-stressing, increases the mechanical strength of each solid element with respect to the strength which it would have in the unstressed state.

Figure 5:
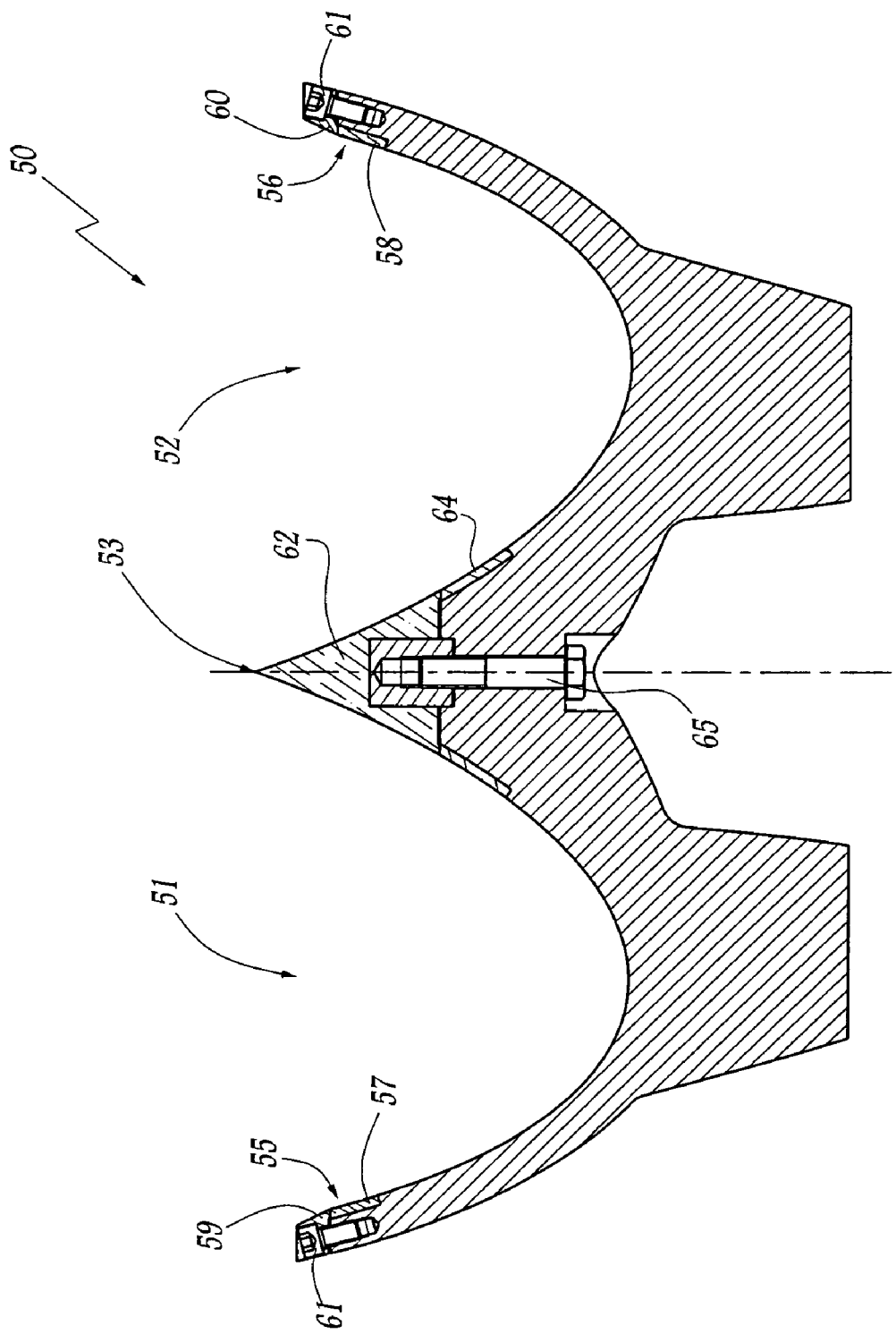
FIG. 5 is a section through a hydraulic member according to the invention forming a bucket for a Pelton turbine wheel.

A member according to the invention can also form a bucket 50, as shown in FIG. 5, for a Pelton turbine wheel. In a conventional way, the bucket 50 has two half-cups separated by a central ridge 53 forming the leading edge of the bucket 50. Each of the half-cups 51 and 52 has a lateral ridge, 55 and 56 respectively, placed opposite the central ridge 53, and forming the lateral trailing edges of the bucket 50. In the illustrated example, the bucket 50 comprises two removable solid elements 57 and 58 made from abrasion-resistant material. The elements 57 and 58 form the parts of the inner surface of the half-cups 51 and 52 adjacent to the trailing edges 55 and 56. Each removable solid element 57 and 58 is then immobilized by another removable solid element 59 and 60 respectively, made from material having high abrasion resistance, which forms the trailing edge of the corresponding half-bucket. Each removable solid element 59, 60 is then fixed by means of screws 61 which place them partially under compression together with the adjacent removable solid element 57, 58. Similarly, the central ridge 53 is formed by a removable solid element 62 made from material having high abrasion resistance which is wedge-shaped and which compresses two removable solid elements 63, 64 in the form of inserts which define part of the surfaces of the half-cups 51 and 52 adjacent to the central ridge 63. The removable element 62 is then fixed by means of tension screws 65 passing through the body of the bucket 50. The use of the removable solid elements 57 to 63 increases the abrasion resistance of the bucket 50 in cases where the water striking it contains solid particles.

Figure 6:
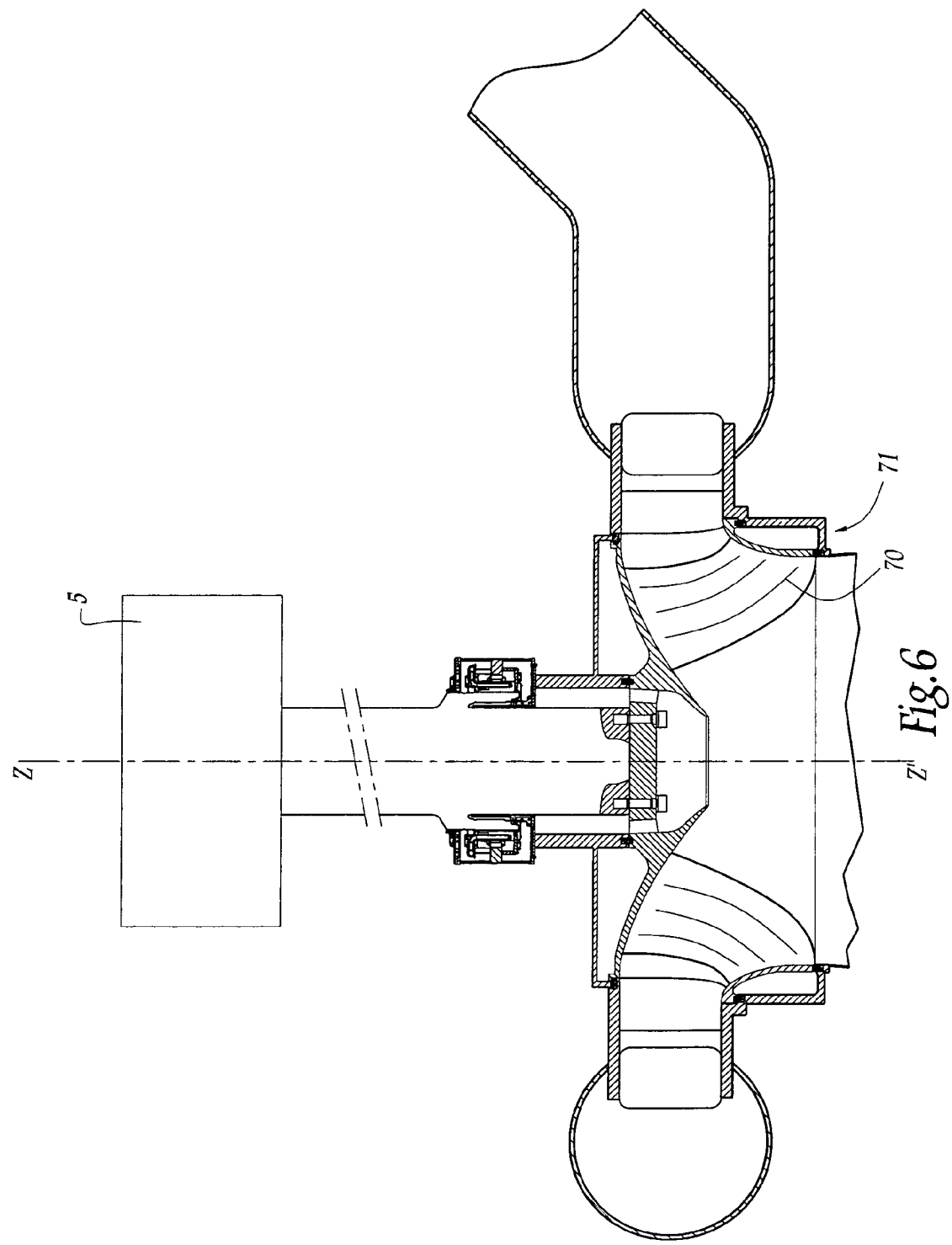
FIG. 6 is a schematic axial section through a hydraulic machine according to the invention of the Francis turbine type, in which the wheel is a hydraulic member according to the invention.

Clearly, a hydraulic member according to the invention is not necessarily used for a Pelton turbine, but can equally well be used for another machine, such as a Francis turbine, as shown in FIG. 6. In this example, the hydraulic member according to the invention forms a Francis wheel 70 whose edges at the position of the lower sealing labyrinth 71 are defined by a succession of removable solid elements.

Clearly, various other modifications can be made to the hydraulic members according to the invention within the scope of the claims.

The invention claimed is:

1. A member of a hydraulic machine through which at least one flow of water passes, the hydraulic member comprising at least one wetted surface extending between two edges of the member, wherein at least one of the edges of the member and part of an adjacent wetted surface are reinforced and formed by a plurality of juxtaposed removable solid elements made from material having a high resistance to abrasion.

2. A member according to claim 1, including means for fixing the removable solid elements in place and at least partially under compression.

3. A member according to claim 1, wherein the reinforced edge is a leading edge of the hydraulic member.

4. A member according to claim 1, wherein the reinforced edge is a trailing edge of the hydraulic member.

5. A member according to claim 1, wherein each removable solid element is made from material having a Vickers hardness of 1000 HV or more.

6. A member according to claim 1, wherein the material from which each removable solid element is made is a technical ceramic including a metallic matrix in which a powder of one or more hard abrasion-resistant materials is dispersed.

7. A member according to claim 2, wherein the member forms a flow control tip of a Pelton turbine nozzle and includes a body on which the removable solid elements are stacked, a first of the removable solid elements having a generally annular shape with an outer surface having a generally conically tapering shape while a final one of the removable solid elements has a shape of a conically tapering tip with a nominal diameter smaller than the nominal diameter of the first removable solid element, and fixing means exerting tension on the final removable solid element in such a way so as to place at least part of the first solid element under compression.

8. A member according to claim 2, forming a Pelton turbine nozzle orifice having a body including a through bore, one of the removable solid elements being fitted in the through bore and having a generally annular shape so as to form a hydraulic ejection orifice and a bearing seat for a tip of the nozzle for controlling the flow, the one of the solid elements being surrounded by a band for placing the one removable solid element under compression.

9. A member according to claim 1, forming a bucket of a Pelton turbine wheel and including at least one central removable solid element forming a leading edge of a central ridge of the bucket and at least two lateral removable solid elements, each forming part of a lateral trailing edge of the bucket.

10. A member according to claim 1, forming a wheel of a Francis turbine and in that the removable solid elements form at least one labyrinth.

11. A member according to claim 1, forming a flow control tip of a Pelton turbine nozzle and having a body on which the removable solid elements are stacked, a first of the removably solid elements having a generally annular shape with an outer surface having a generally conically tapering shape and a final one of the removable solid elements has a shape of a conically tapering tip with a nominal diameter smaller than the nominal diameter of the first removable solid element, and fixing means exerting tension on the final removable solid element so as to place at least part of the first solid element under compression.

12. A member according to claim 1, forming a Pelton turbine nozzle orifice including a through bore in which one of the removable solid elements is fitted and having a generally annular shape so as to form a hydraulic ejection orifice and a bearing seat for a tip of the nozzle for controlling the flow, the one removable solid element being surrounded by a band which places the one solid element under compression.

13. A member according to claim 1, forming a wheel of a reversible turbine, and in that the removable solid elements form at least one labyrinth.

14. A hydraulic machine comprising at least one hydraulic member through which at least one flow of water passes, the hydraulic member including at least one wetted surface extending between two edges of the member, wherein at least one of the edges of the member and part of an adjacent wetted surface are reinforced and formed by a plurality of juxtaposed removable solid elements made from material having a high resistance to abrasion.

15. A member of a hydraulic machine through which at least one flow of water passes, the hydraulic member comprising at least one wetted surface extending between two edges of the member, wherein at least one of the edges of the member and part of an adjacent wetted surface are reinforced and formed by at least one removable solid element made from material having a high resistance to abrasion, and wherein the material from which the at least one removable solid element is made is a technical ceramic including a metallic matrix in which a powder of one or more hard abrasion-resistant materials is dispersed.

* * * * *